United States Patent [19]
Wade

[11] Patent Number: 5,668,307
[45] Date of Patent: Sep. 16, 1997

[54] APPARATUS FOR TESTING CAN ENDS FOR LEAKS

[76] Inventor: James H. Wade, 19174 Madison Ave., Castro Valley, Calif. 94546

[21] Appl. No.: 643,934

[22] Filed: May 7, 1996

[51] Int. Cl.⁶ .................................................. G01M 3/04
[52] U.S. Cl. ........................................... 73/40.7; 73/41
[58] Field of Search ............................. 73/40.7, 40, 45, 73/45.1, 41

[56] References Cited

U.S. PATENT DOCUMENTS

| | | | |
|---|---|---|---|
| 2,696,107 | 12/1954 | Blaing-leisk | 73/43 |
| 3,231,065 | 1/1966 | Kaminski et al. | 198/131 |
| 3,399,563 | 9/1968 | Helms | 73/45.2 |
| 3,499,314 | 3/1970 | Roberts et al. | 73/45.2 |
| 3,633,406 | 1/1972 | Helms | 73/45.5 |
| 3,674,160 | 7/1972 | Gutowski | 214/17 B |
| 3,792,606 | 2/1974 | Munger | 73/40 |
| 3,812,953 | 5/1974 | Maschke | 198/131 |
| 3,827,284 | 8/1974 | Armstrong et al. | 73/45.1 |
| 3,875,789 | 4/1975 | Orosy | 73/40 |
| 3,875,790 | 4/1975 | Herdzina et al. | 73/40 |
| 3,954,003 | 5/1976 | Dobbins | 73/40 |
| 4,055,455 | 10/1977 | McDonald et al. | 156/351 |
| 4,086,497 | 4/1978 | Murray | 250/562 |
| 4,184,362 | 1/1980 | Standley et al. | 73/40.7 |
| 4,440,016 | 4/1984 | Konagaya et al. | 73/40 |
| 4,495,797 | 1/1985 | Cassell, Jr. et al. | 73/40 |
| 4,860,569 | 8/1989 | Herdzina | 72/361 |
| 4,930,342 | 6/1990 | McDaniel | 73/49.3 |
| 4,934,180 | 6/1990 | Hulsman | 73/49.3 |
| 4,946,028 | 8/1990 | Eichmann et al. | 198/688.1 |
| 5,042,289 | 8/1991 | Jensen | 73/40 |
| 5,111,684 | 5/1992 | Stauffer et al. | 73/49.3 |
| 5,119,924 | 6/1992 | Kaminski | 198/803.15 |
| 5,145,292 | 9/1992 | Bulso, Jr. et al. | 406/88 |
| 5,307,139 | 4/1994 | Tyson, II et al. | 356/35.5 |
| 5,342,250 | 8/1994 | Sanders | 474/249 |
| 5,349,843 | 9/1994 | Hubball | 72/344 |
| 5,417,105 | 5/1995 | Martinez et al. | 73/40.7 |

*Primary Examiner*—Hezron E. Williams
*Assistant Examiner*—Jay L. Politzer
*Attorney, Agent, or Firm*—Thomas R. Lampe

[57] ABSTRACT

Apparatus for testing can lids or other discrete articles for leaks includes a conveyor belt having a plurality of grommets attached thereto. The articles to be tested are placed on the grommets and tested for leaks by applying a pressurized gas to one side of the articles while applying a vacuum to the other side of the articles. A detector detects the flow of a gaseous fluid through the discrete articles as a result of the vacuum application or as a result of the combined application of vacuum and pressurized gas.

18 Claims, 11 Drawing Sheets

APPARATUS FOR TESTING CAN ENDS FOR LEAKS

TECHNICAL FIELD

This invention relates to apparatus for testing discrete articles having opposed surfaces for leaks. The invention is particularly applicable for testing can ends.

BACKGROUND ART

Beverage cans and cans for other products often employ can ends or lids which are secured to the can body after the can body has been filled. The terms can "end" and can "lid" are interchangeably employed herein. Typically, the can lids employ manually manipulated closure elements which are utilized by the consumer to obtain access to the beverage or other product in the assembled can.

It is very important that the lid or end structure be leak-proof so that the can contents remain wholesome and palatable. For this reason various testing procedures have been established to detect whether lids are leak-proof prior to assembly of the filled can. It is known, for example, to insert one or more lids into a fixture or device and then apply pressurized helium or other gas to a side of the can lid or lids. This is often a manual process. An associated gas detector employed in the device detects the passage of any gas through the can lid. Prior art arrangements of this nature are characterized by their relatively slow speed of use and only a very small percentage of lids from a batch or supply thereof can be efficiently and economically tested. On the one hand, such a small percentage sample can result in leaking lids being undetected altogether. On the other hand, detection of a leaking lid on a narrow or small percentage sample basis can result in rejection of the entire supply of lids subject to random test, a result which may not in fact be warranted.

Another prior art approach for testing can lids has been to employ a source of light at one surface of the lid and a light detector at the opposing surface thereof. While this approach has the merit of being faster than the gas test approach outlined above, use of light may not detect leaks in a can lid since light will not go around corners and some defective can lids may require precisely that if certain types of can defects causing leaks are to be detected.

The following patents are believed to represent the current state of the art in the field of the present invention and the patents disclose a number of arrangements for detecting leaks and flaws in various types of articles, including can lids: U.S. Pat. No. 3,674,160;, issued Jul. 4, 1972, U.S. Pat. No. 4,055,455, issued Oct. 25, 1977, U.S. Pat. No. 4,934, 180, issued Jun. 19, 1990, U.S. Pat. No. 5,307,139, issued Apr. 26, 1994, U.S. Pat. No. 5,417,105, issued May 23, 1995, U.S. Pat. No. 5,111,684, issued May 12, 1992, U.S. Pat. No. 4,184,362, issued Jan. 22, 1980, U.S. Pat. No. 4,086,497, issued Apr. 25, 1978, U.S. Pat. No. 4,946,028, issued Aug. 7, 1990, and U.S. Pat. No. 3,633,406, issued Jan. 11, 1972.

The invention disclosed and claimed herein is not shown in the above-identified patents.

DISCLOSURE OF INVENTION

The present invention relates to apparatus for testing can lids or other discrete articles having opposed surfaces for leaks. The apparatus includes a moveable conveyor and means for positioning a plurality of discrete articles having opposed article surfaces at locations on said conveyor with one article surface facing the conveyor and the other article surface facing away from the conveyor. Vacuum applicator means is provided for substantially simultaneously applying a vacuum to each of the plurality of discrete articles on the conveyor at the article surface thereof facing the conveyor.

Detector means is incorporated in the apparatus for detecting the flow of a gaseous fluid through the plurality of discrete articles on the conveyor during application of vacuum thereto.

Article removal means is responsive to the detecting of the flow of gaseous fluid through at least one of the plurality of discrete articles on the conveyor by the detector means to remove the plurality of discrete articles from the conveyor.

The conveyor comprises a conveyor belt having an outer conveyor belt surface and a plurality of grommets attached to the conveyor belt on the outer conveyor belt surface. Each grommet is for supporting a discrete article of the plurality of articles. The grommets and the conveyor belt have openings therein providing a plurality of gaseous fluid flow paths leading from discrete articles positioned on the grommets to the detector means.

Other features, advantages, and objects of the present invention will become apparent with reference to the following description and accompanying drawings.

MODES FOR CARRYING OUT THE INVENTION

Referring now to FIGS. 1–13, 18 and 19, apparatus constructed in accordance with the teachings of the present invention is illustrated. The apparatus includes a conveyor in the form of an endless conveyor belt 10 which is preferably constructed of fiberglass. Such material has been found to provide excellent strength when practicing the present invention. Conveyor belt 10 is driven by an electric motor 12 and is disposed about the rotatable shaft of the motor as well as about idler rollers 14.

Figure 6:
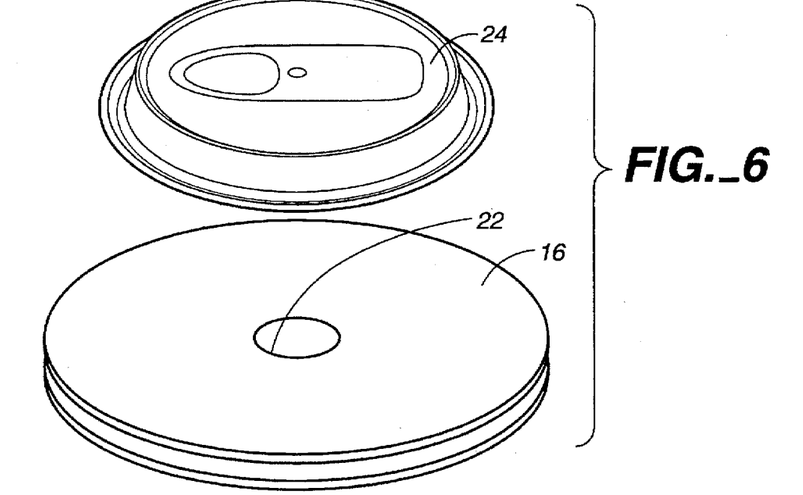
FIG. 6 is an exploded, perspective view of a can lid and a grommet incorporated in the apparatus conveyor.
Figure 9:
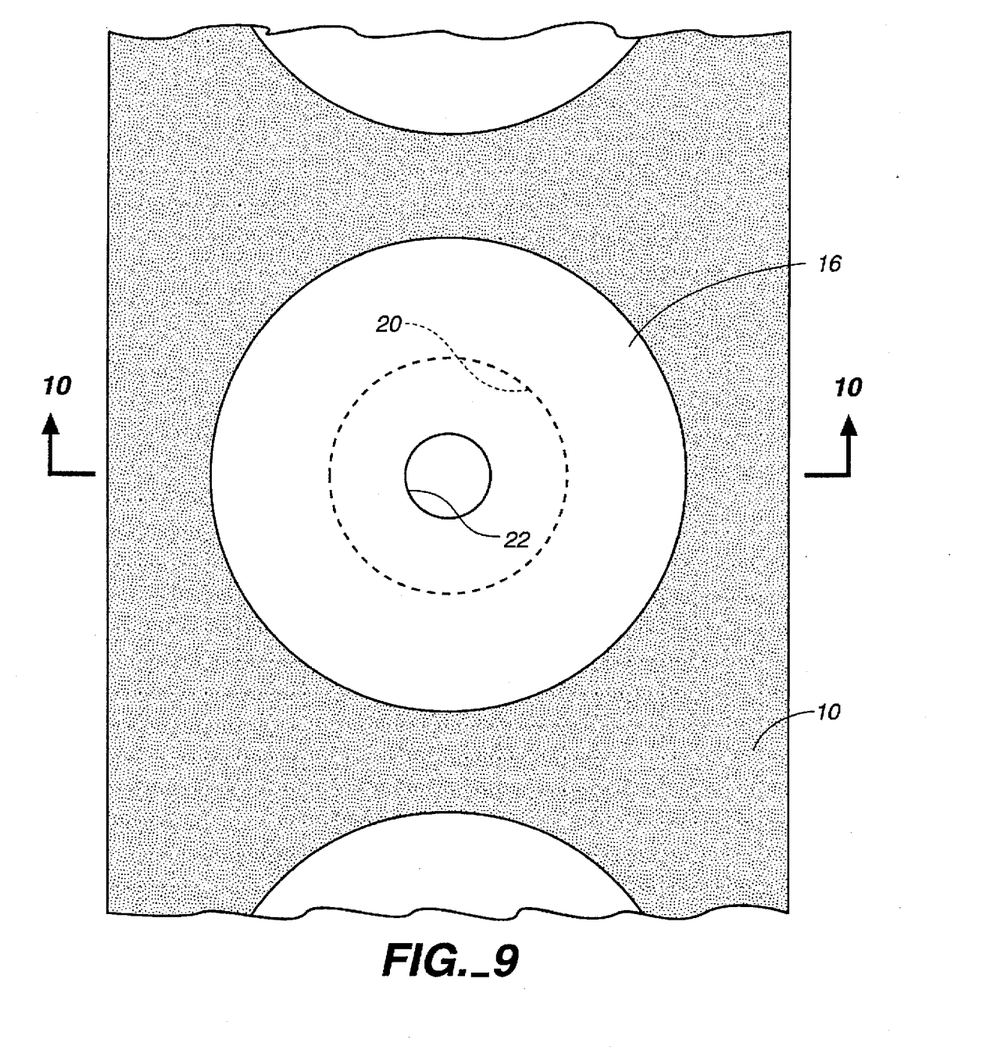
FIG. 9 is a top plan view of a portion of the conveyor belt and a grommet attached thereto.
Figure 10:
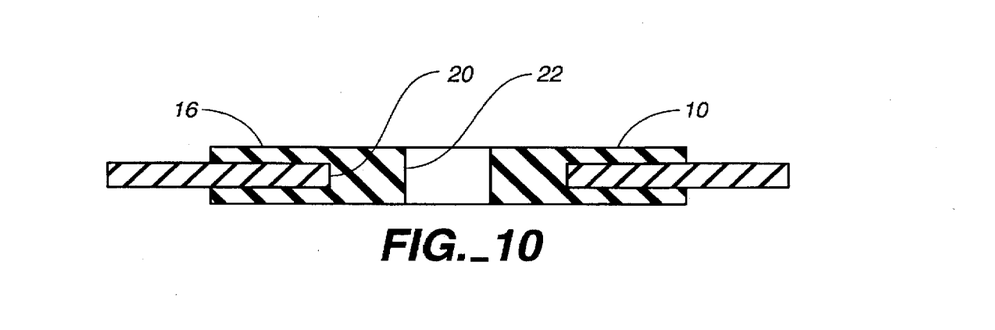
FIG. 10 is a cross-sectional view taken along the line 10—10 in FIG. 9.

Attached to the outer surface of conveyor belt 10 at spaced locations thereon are a plurality of grommets 16 formed of resilient material, preferably molded rubber material. Viton fluoroelastomer made available by Du Pont is appropriate for usage in the present invention since it is both resilient and leak-proof. As will be seen below, it is important that a fluid-tight seal be formed between the grommets and can lids supported thereon during lid leak testing. Suitably, adhesive (not shown) is employed to secure the grommets in position on the conveyor belt.

A plurality of spaced and aligned openings 20 are formed in the conveyor belt 10 which accommodate the grommets 16. The grommets radiate outwardly from the openings 20 on both sides of the belt. The grommets 16 have openings 22 formed therein.

Figure 1:
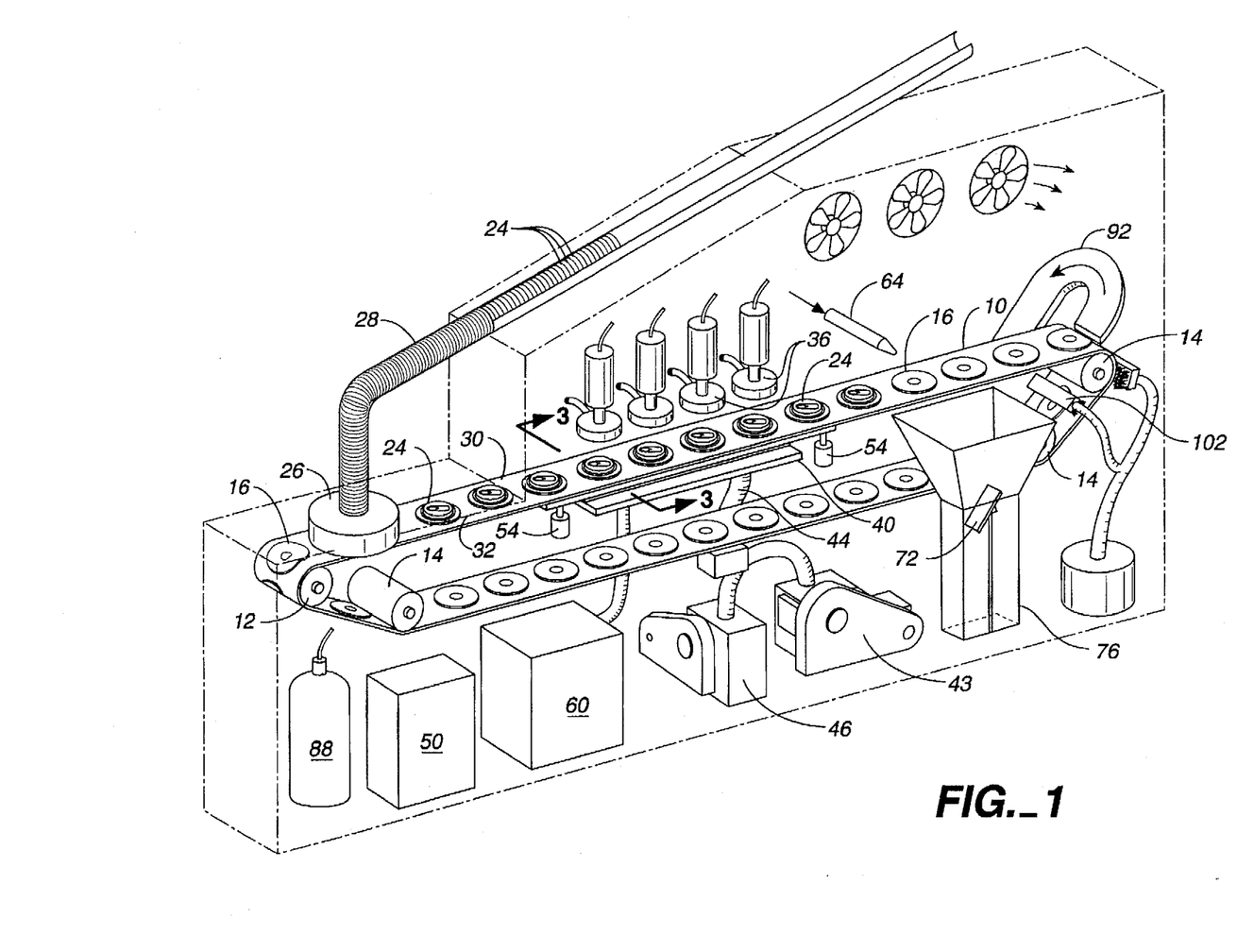
FIG. 1 is a frontal, perspective view of apparatus constructed in accordance with the teachings of the present invention.

The grommets are for the purpose of supporting can lids 24, the lids being delivered onto the grommets by a lid delivery system 26 including an in-feed chute 28 which is kept loaded by the operator. Lid delivery system 26 may be of any suitable conventional construction.

Figure 7:
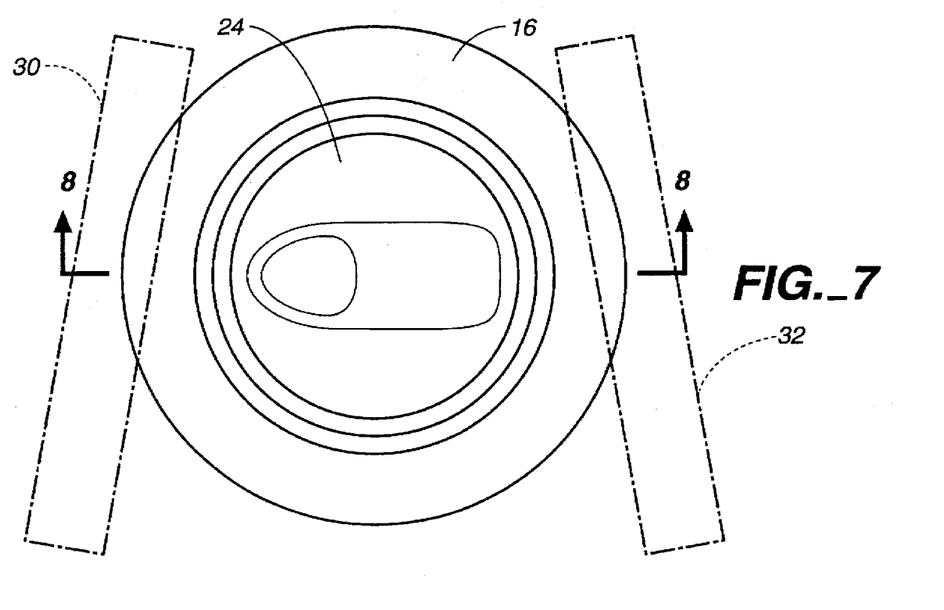
FIG. 7 is a top plan view illustrating a conveyor grommet having a can lid thereon and alignment guide members, the latter being shown in phantom.
Figure 8:
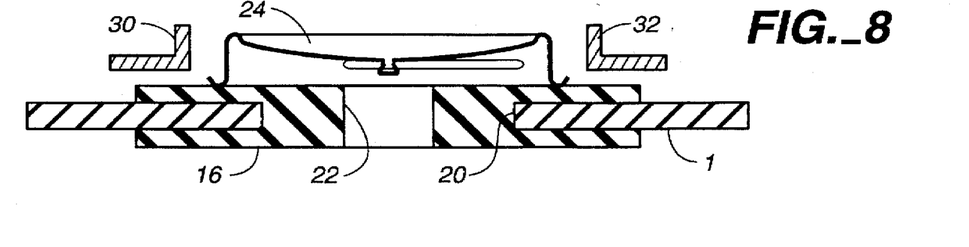
FIG. 8 is a sectional view taken along the line 8—8 in FIG. 7.

In the operation of the present invention it is important that each end or lid 24 be located on a grommet and surrounds the opening 22 thereof. Lids 24 delivered by lid delivery system 26 onto the grommets pass between alignment guide members 30, 32 as the conveyor transports the lids from the location of the lid delivery system. With particular reference to FIGS. 1, 7 and 8, it will be seen that the members 30, 32 converge in the direction of conveyor belt movement so that a lid which is not properly aligned will be moved either to the right or to the left by an alignment guide member before exiting the space therebetween.

Next, the conveyor brings four of the lids supported by the grommets under four pressure heads 36 of identical construction. In the operation of the present invention, the conveyor belt 10 is moved step fashion so that it moves in increments corresponding to the distance between the endmost of four lids. That is, the conveyor belt advances the lids (as well as the grommets supporting same) in increments of four. Of course, the number of lids in any given batch will depend upon the number of pressure heads 36 incorporated in the apparatus. A lesser number of heads or a greater number of heads than the four illustrated herein may suitably be employed when practicing this invention.

Figure 19:
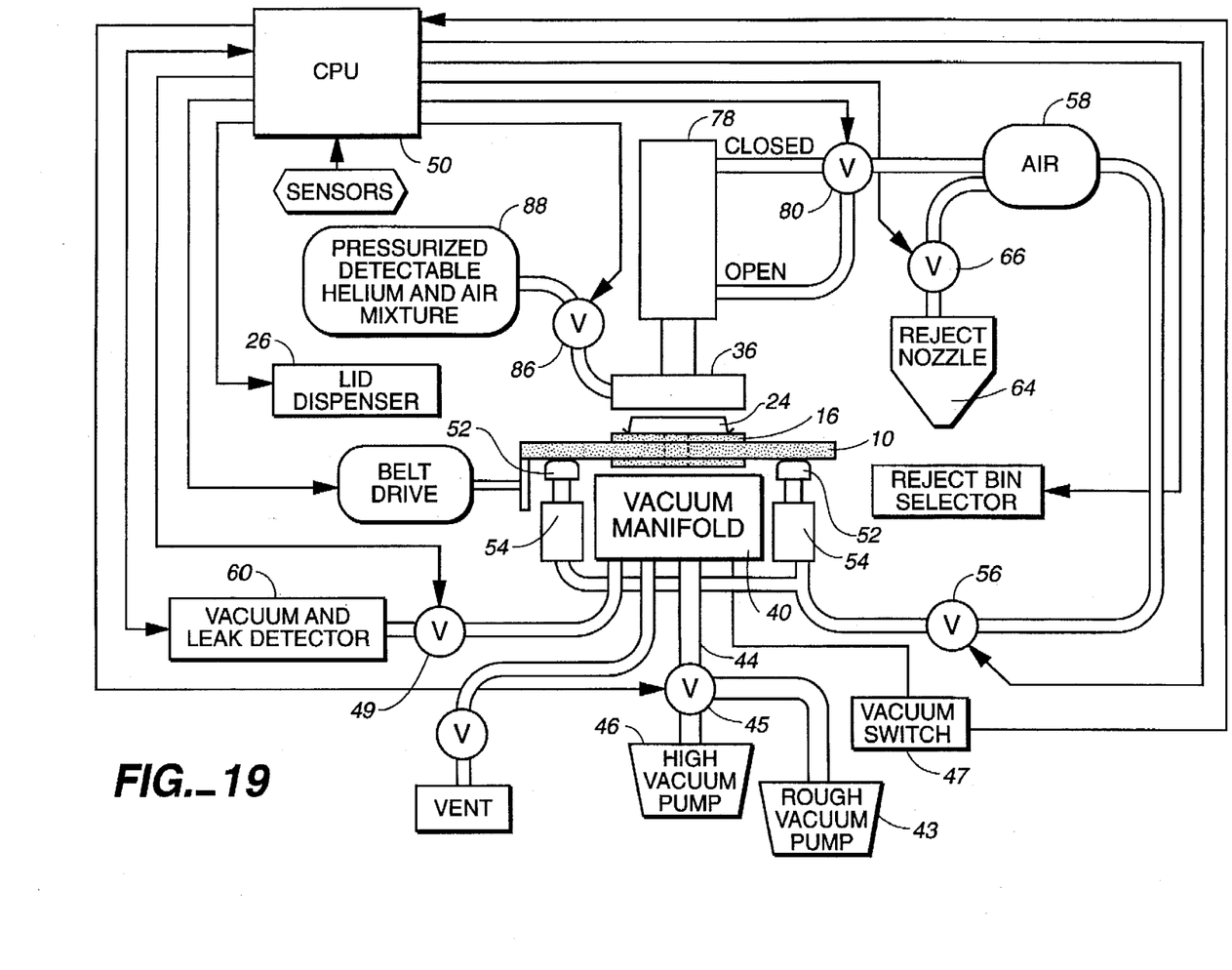
FIG. 19 is a flow diagram illustrating control of selected components of the apparatus during the operation thereof.

Disposed under the upper run of conveyor belt 10 and under the four illustrated pressure heads 36 is a vacuum table 40 or manifold having four openings 42 leading to the vacuum table interior. The interior of the vacuum table is in communication with a conduit 44 leading to a valve 45 (FIG. 19). Valve 45 is connected to a continuously operating rough vacuum pump 43 and a high vacuum pump 46. When the four lids of a batch being tested are in position under their respective pressure heads 36, the openings 22 of the grommets supporting the lids will be in communication with vacuum table openings 42.

Figure 13:
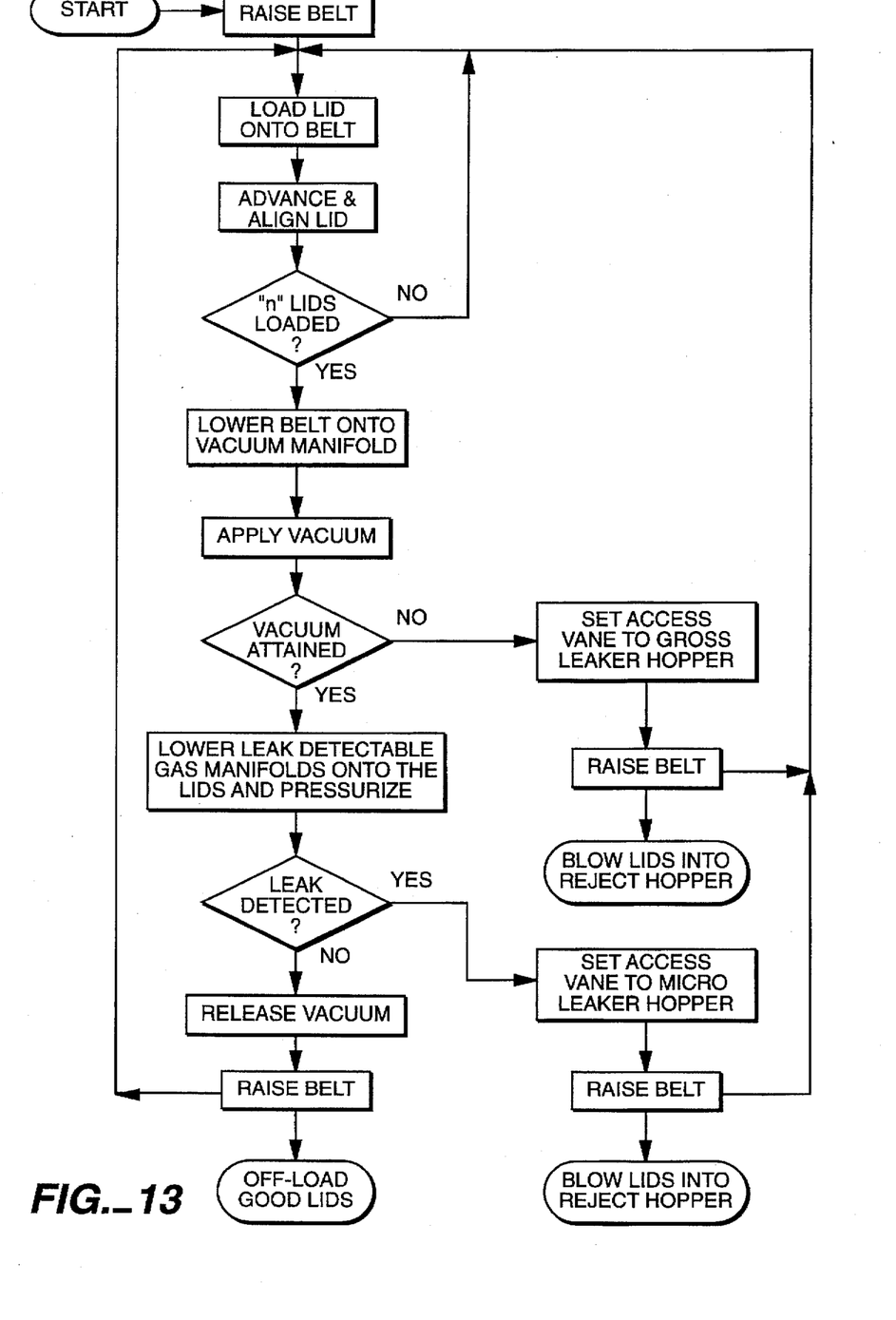
FIG. 13 is a flow chart illustrating steps carried out during operation of the apparatus.

In the apparatus disclosed, conveyor belt movement is controlled by a suitably programmed central processing unit (CPU) 50 (FIG. 19) along with other mechanisms and operations of the apparatus such as lid delivery system 26 mentioned above and others described below. Reference may also be had to FIG. 13 which illustrates the protocol followed during operation of the apparatus.

Figure 3:
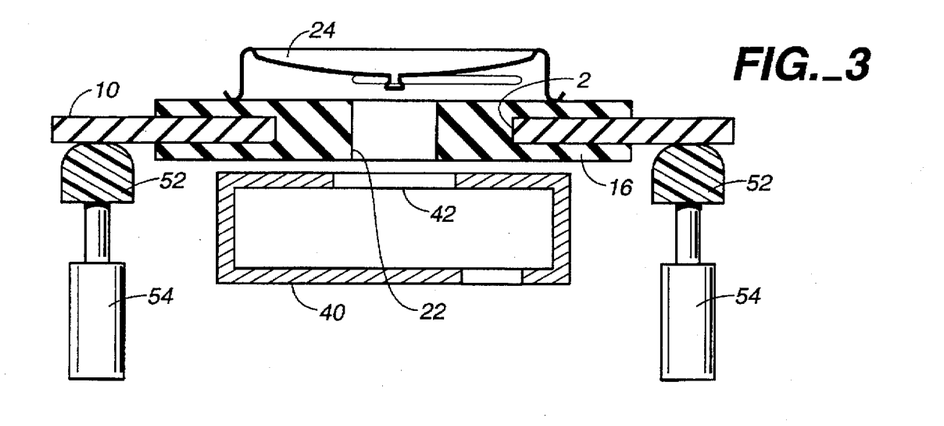
FIGS. 3, 4 and 5 are sectional, diagrammatic views taken generally along line 3—3 in FIG. 1 and illustrating the relative positions assumed by selected structural components of the invention at sequential steps of the operation thereof.

As can be seen in FIG. 3, for example, a distance is normally maintained between the conveyor and the vacuum table 40 during transport of the conveyor belt. The conveyor belt 10 is prevented from contacting the vacuum table by rail-like supports 52 which are associated with air cylinders 54 and moveable between the extended positions shown in FIG. 3 to the retracted positions shown in FIGS. 4 and 5.

Figure 4:
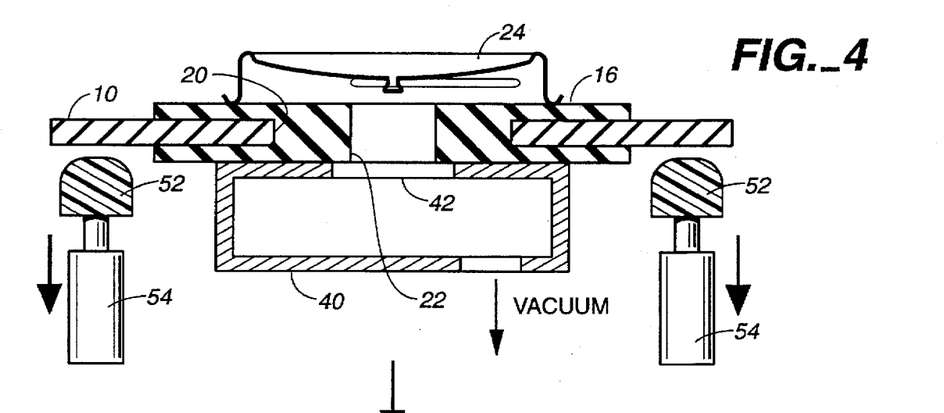
Figure 5:
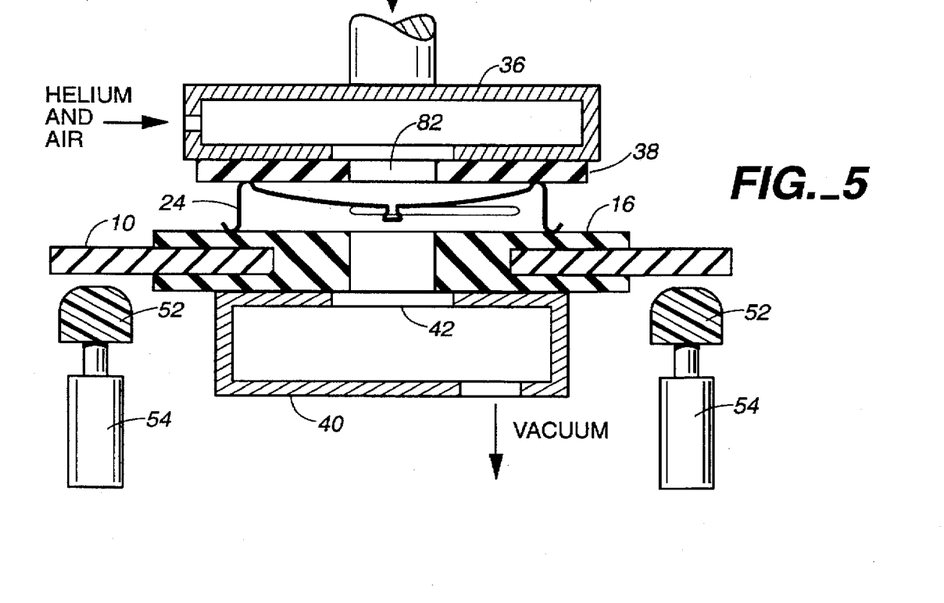

When the four lids to be tested are disposed under pressure heads 36, the supports 52 are moved from the extended positions of FIG. 3 downwardly to the positions shown in FIGS. 4 and 5. This places the four grommets 16 holding the lids under test directly in engagement with the top of the vacuum table, openings 22 of the grommets being in communication with openings 42 of the vacuum table. CPU 50 now controls valving 56 operatively associated with pneumatic cylinders 54 and a source of compressed air 58 to pull supports 52 downwardly. Valve 45 is then actuated by CPU 50 so that a vacuum is applied through grommet openings 22 of the grommets holding the four lids under test to the underside of the lids by rough vacuum pump 43. Pump 43 is for the purpose of withdrawing a high percentage of air (e.g. 99.99 percent) from the manifold within a set time limit. A vacuum switch 47 is operatively connected to the manifold interior.

Figure 2:
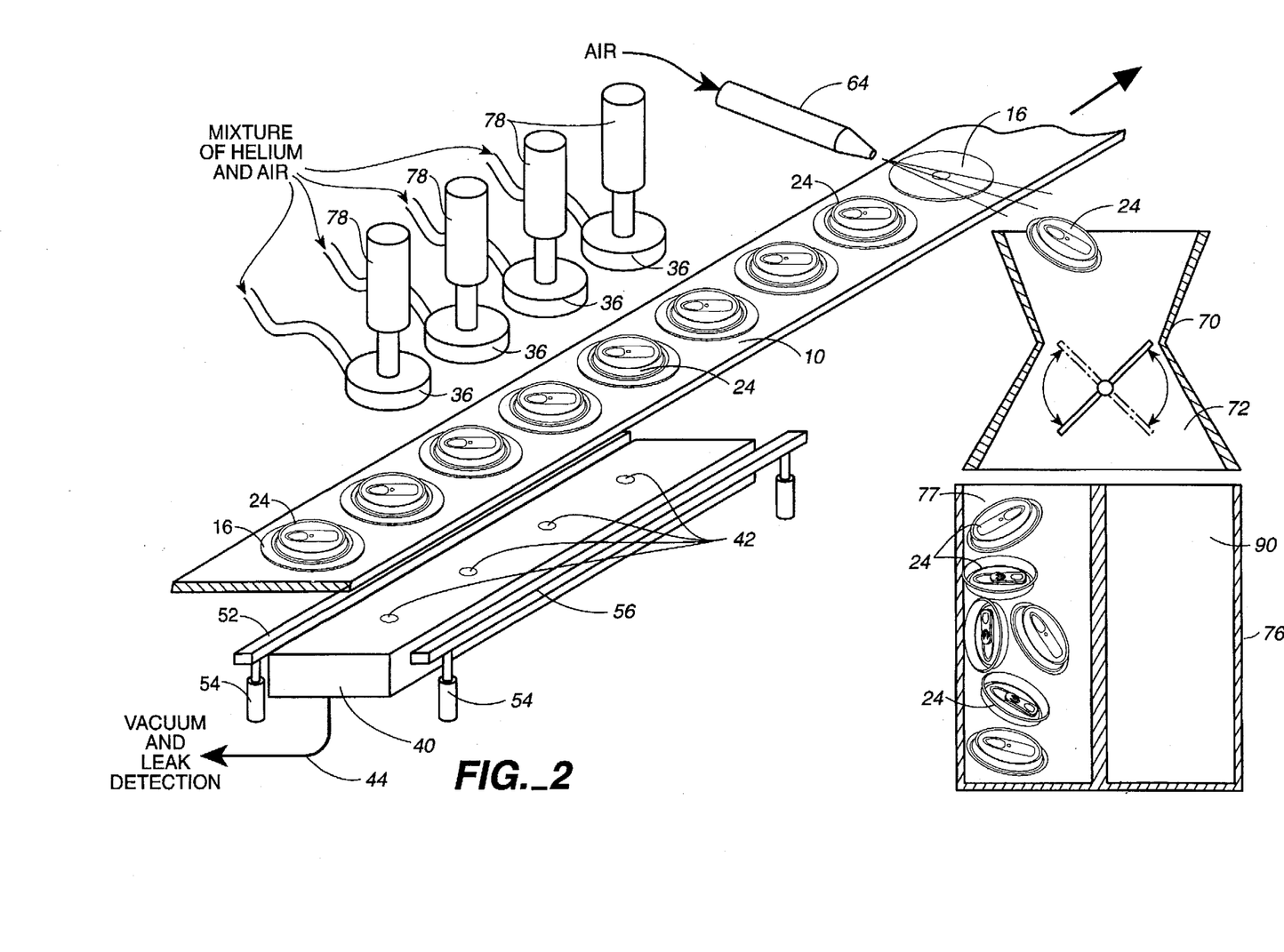
FIG. 2 is a schematic, perspective view of selected structural elements of the apparatus, some of which are illustrated in cross-section.

A vacuum and leak detector 60 of any known commercial construction also is operatively associated with the vacuum table 40. A particularly suitable detector is the Model 925-40 helium mass spectrometer made available by Varian Corporation. Failure to attain the desired vacuum level in table 40 within a set time under vacuum from rough vacuum pump 43 (as detected by vacuum switch 47) means that at least one of the lids under test is a "gross" leaker and CPU 50 disengages the conveyor belt from the vacuum table, reactivates the drive motor for conveyor belt 10, and causes movement of the tested lids past an air nozzle 64 operatively associated with compressed air supply 58. The CPU 50 opens a valve 66 operatively associated with air nozzle 64 and the four tested can lids are blown off their respective grommets by the nozzle, as shown in FIG. 2.

The gross leaker lids are discharged into the inlet of a separator 70 having a moveable vane 72 disposed therein. Vane 72 diverts the gross leaker can lids to one compartment 74 of a dual compartment bin 76. CPU 50 controls the action of the vane 72 to ensure segregation of the gross leaking can lids. Any suitable means may be employed to move the vane 72 to the desired position such as an air cylinder or solenoid (not shown). The vane 72 is moveable between the solid line position and phantom line position illustrated in FIG. 2.

If, however, the desired vacuum in vacuum table 40 is attained within the set period of time through the action of rough vacuum pump 43, valve 45 establishes communication between high vacuum pump 46 and the vacuum table interior. Now the object is to attain a very high vacuum (e.g.

350 microns) within a set period of time. Accomplishing this end will result in opening of a valve 49 by the CPU. Open valve 49 establishes communication between leak detector 60 and the vacuum table interior. Failure of pump 46 to attain a set high vacuum within a set time will cause "dumping" of the can lids under test as described above with respect to pump 43.

If the lids under test do not contain a gross leaker, the conveyor belt will not immediately be moved to discharge the batch of can lids in the manner described above. Instead, air cylinders 78 operatively associated with pressure heads 36 will be brought into communication with a source of compressed air 58 by CPU 50 which controls a valve 80 between the air cylinders and the source of compressed air. This will cause downward movement of the pressure heads 36 into engagement with the four can lids 24 disposed thereunder. This situation is shown in FIG. 5. Each pressure head 36 includes a seal member 38 which creates an air-tight seal between the pressure head and the top of its respective lid 24. An opening 82 is defined by the pressure head and such opening communicates with the interior of the pressure head.

When the structural components shown in FIG. 5 are in the relative positions shown in that figure, a lid 24 is clamped firmly between the pressure head seal member 38 and the supporting grommet 16. The grommet itself being clamped between the lid and the top of the vacuum table 40.

CPU 50 now opens a valve 86 connecting the interiors of all four pressure heads to a source of pressurized helium gas 88. A buildup of helium gas takes place within the pressure heads and the pressurized helium gas is applied to the tops of the can lids under test while a vacuum continues to be applied to the opposed bottom sides of the can lids. This operation will occur during application of a vacuum to the vacuum table interior by high vacuum pump 46 and during communication between the leak detector 60 and the vacuum table interior.

If the presence of helium gas is sensed by detector 40, a leak exists in at least one of the can lids of the lids under test. Such leak will not be of the gross variety detected merely by application of vacuum but is undesirable nonetheless.

If the existence of helium is detected by the detector 60, the vacuum in the vacuum table will be terminated and the supports 52 raised upwardly by pneumatic cylinders 54 to disengage the conveyor belt from the vacuum table. In addition, the flow of pressurized helium to the pressure heads 36 will terminate and pressure heads 36 raised out of engagement with the tested lids, all of the above being coordinated and controlled by CPU 50.

The conveyor belt will now be advanced to bring the next batch of four lids to be tested under the pressure heads. The previously tested batch containing a lid having a leaker (but not a gross leaker) will be transported past air nozzle 64 which will be actuated to direct all four of the tested defective lids into separator 70. CPU 50 will have moved the vane 72 to the phantom line position shown in FIG. 2 so that the can lids in the batch which tests positive for leaks but does not include gross leakers will be directed by the vane to compartment 90 of bin 76. Thus, gross leaker lids are separated from lids which contain lesser defects. This can be helpful when analyzing the cause of such defects and taking corrective measures. Signals (not shown) may be employed to indicated when the bin compartments are full.

Assuming, however, that no leaker lids of any type are found in a batch under test, the conveyor will simply discharge the acceptable lids to a discharge chute 92 which directs the lids to a desired destination such as the actual can filling and forming line (not shown).

Figure 14:
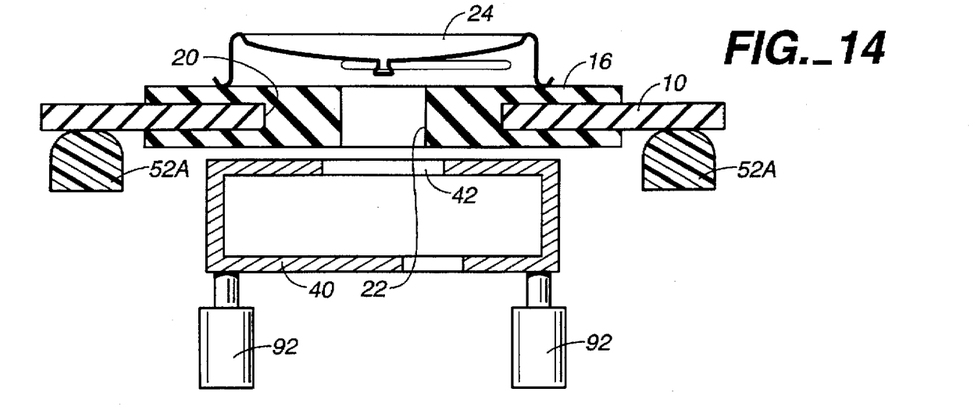
FIGS. 14, 15 and 16 are views similar to FIGS. 3, 4 and 5, but illustrating an alternate embodiment of the invention.
Figure 15:
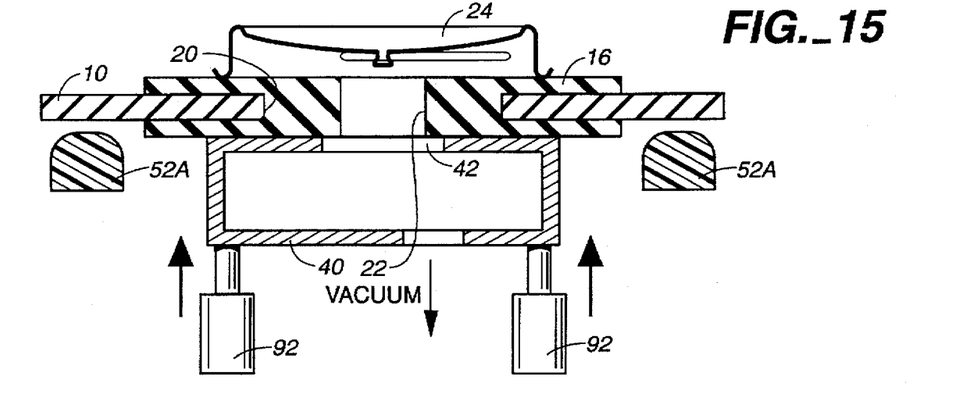
Figure 16:
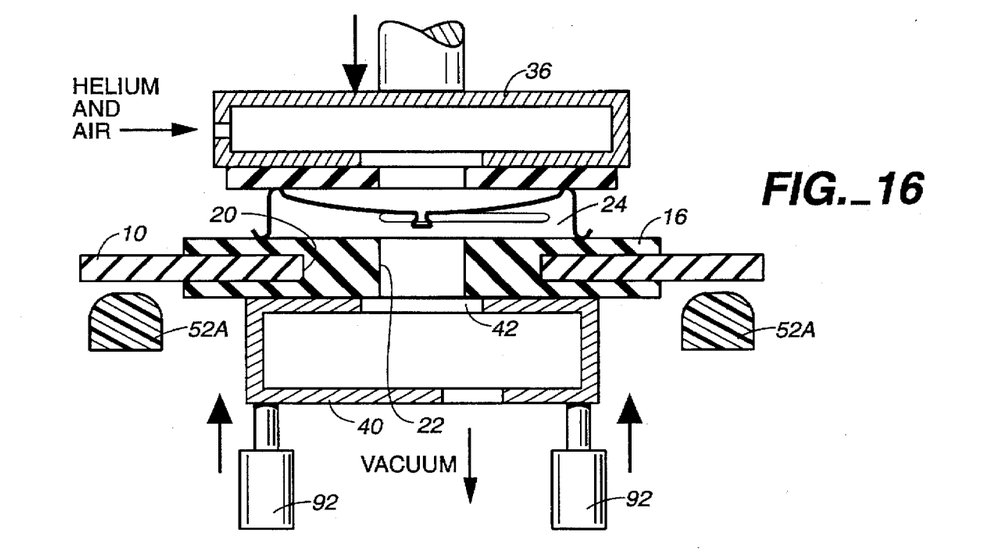
Figure 17:
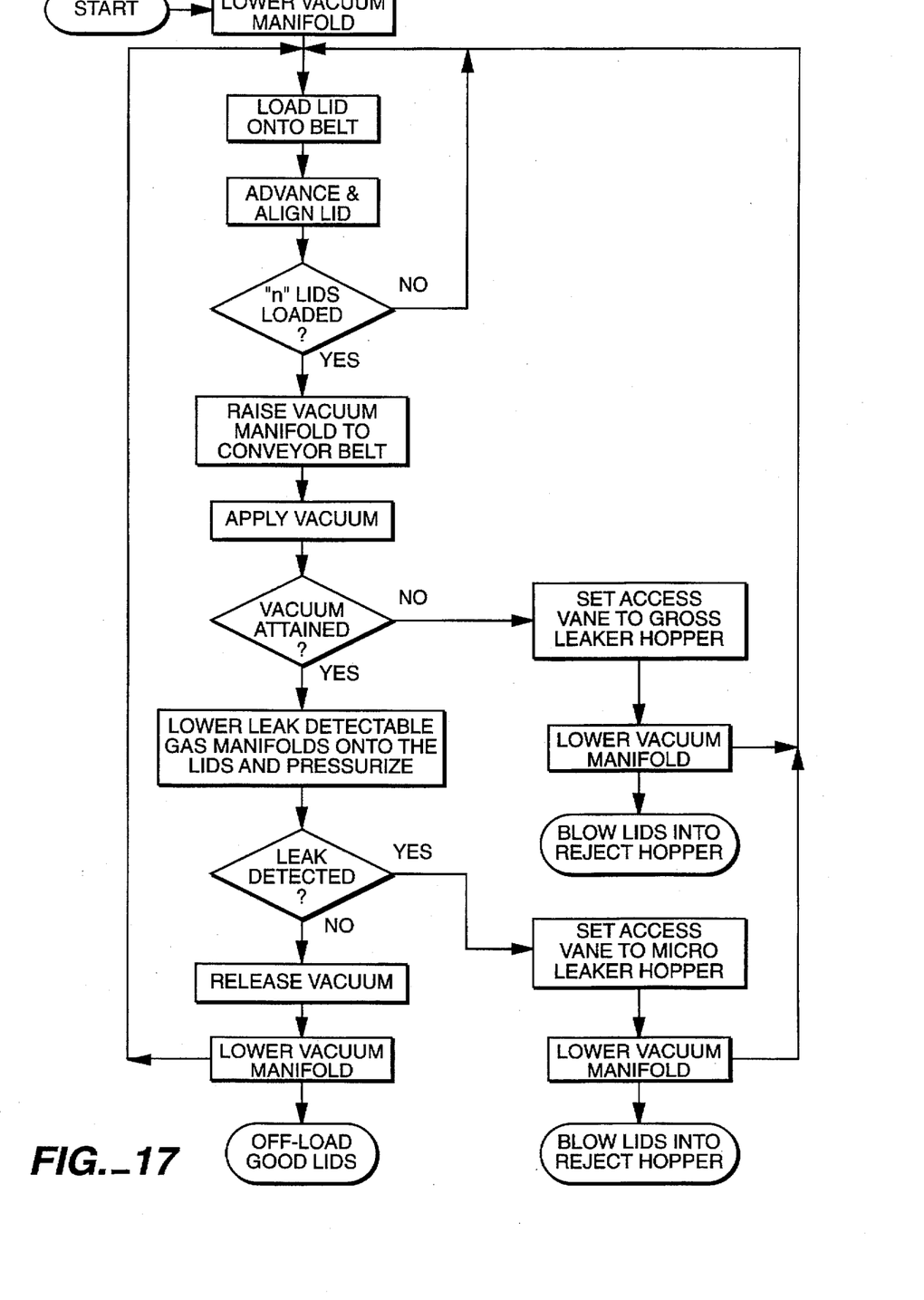
FIG. 17 is a view similar to FIG. 13 but illustrating the steps carried out by the alternative form of apparatus illustrated in FIGS. 14 through 16.
Figure 18:
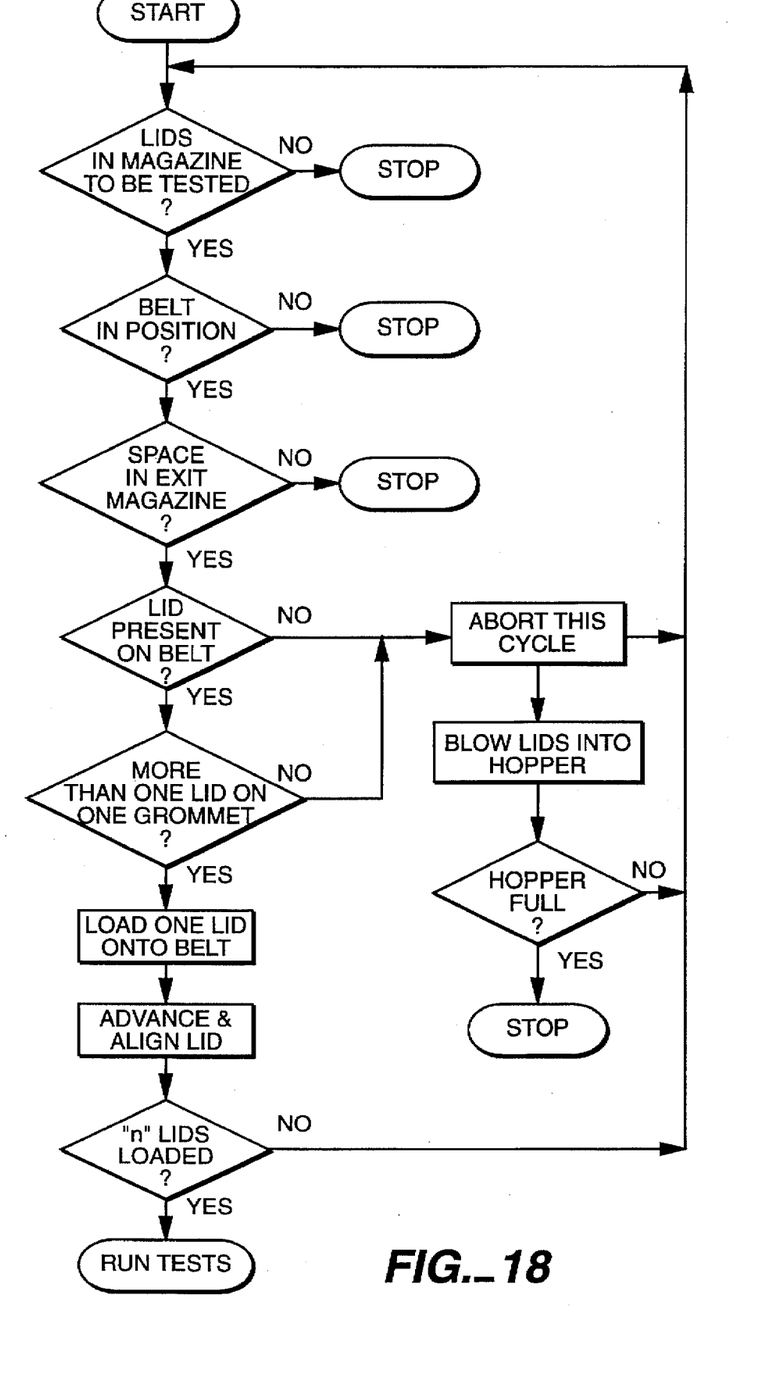
FIG. 18 is a diagrammatic flow chart pertaining to the sensing of various conditions in the apparatus during the operation thereof.

FIGS. 14, 15 and 16 illustrate a somewhat different arrangement wherein the vacuum table is connected to air cylinders 92 which move the vacuum table 40 toward and away from the conveyor belt 10 to bring these structures into and out of engagement. This differs from the previously described arrangement in which the conveyor belt 10 is moved to bring it into engagement with the vacuum table. In this instance, the support rails 52A do not move. The protocol followed by this embodiment of the apparatus is shown in FIG. 17.

Figure 11:
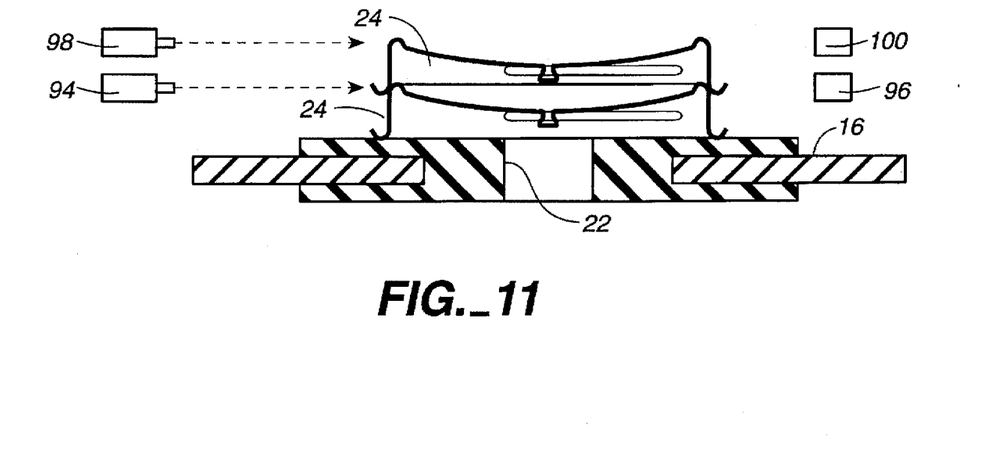
FIG. 11 is a diagrammatic, partial sectional view illustrating a portion of the apparatus conveyor, two stacked can lids and sensors for sensing the absence of a can lid on a grommet and for sensing the presence of more than one can lid.

Preferably, the apparatus constructed in accordance with the teachings of the present invention incorporates still additional features which contribute to its overall effectiveness. For proper operation of the present invention it is important that can lids be in position over all of the grommets of the conveyor. If a can lid is not located on one of the grommets disposed under pressure heads 36 a vacuum cannot be applied by vacuum pump or source 46. It is therefore desirable to incorporate a sensor which will sense the absence of a can lid on a grommet between the location of the lid delivery system and the location of the pressure heads. FIG. 11 shows a sensor including a light source 94 and a light detector 96 for detecting the presence of light from light source 94. This will only happen if no can lid 24 is located on a grommet passing between the light source 94 and light detector 96. Such a condition will be inputted to CPU 50. CPU 50 will halt the conveyor and the apparatus will shut down.

Also, the conveyor will stop and apparatus shut down if more than one can lid is located on any one grommet. FIG. 11 shows a sensor light source 98 which cooperates with a light detector 100. Light will not be detected by detector 100 if more than one lid is located on grommet 16. Detection of more than one lid will be inputted to CPU 50 which will carry out shut down procedures.

Figure 12:
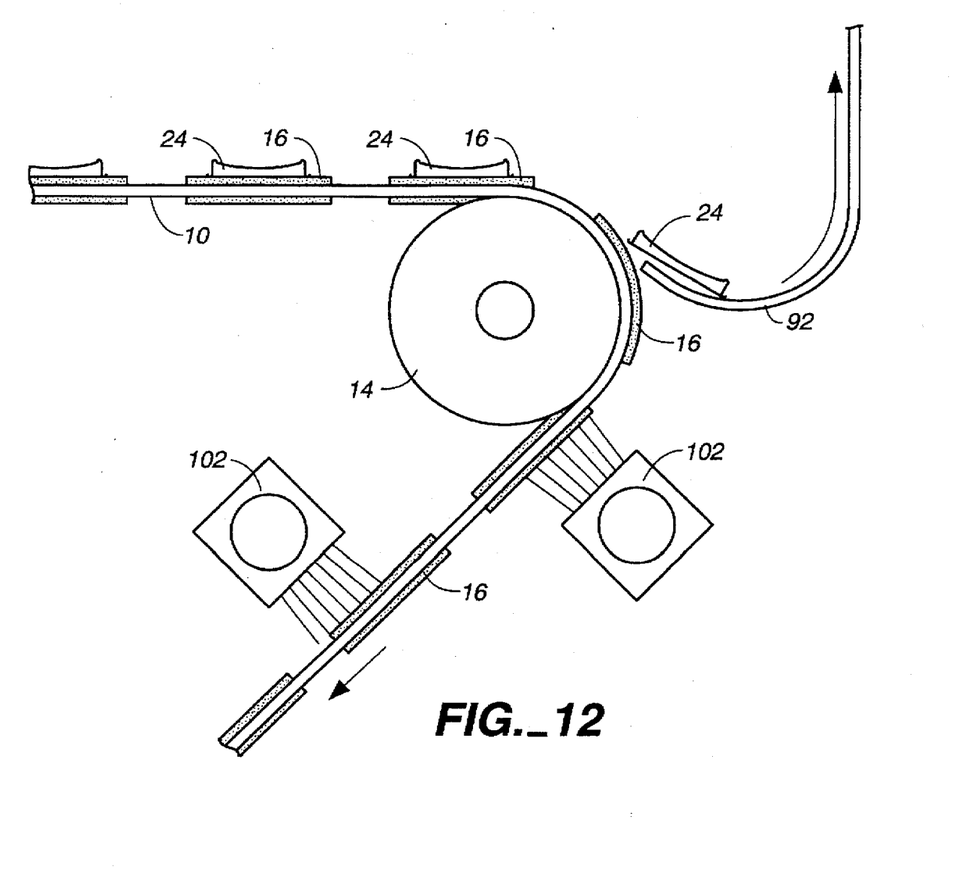
FIG. 12 is a diagrammatic view of a section of the moveable conveyor of the invention and cleaners for the conveyor.

FIG. 12 shows in somewhat diagrammatic fashion the use of brushes 102 to clean and dress the grommets 16 after can lids have been discharged therefrom. If desired, the brushes can be connected to a vacuum source to remove the brushed material to another location.

I claim:

1. Apparatus for testing can lids or other discrete articles having opposed surfaces for leaks, said apparatus comprising, in combination:

a movable conveyor;

means for positioning a plurality of discrete articles having opposed article surfaces at locations on said conveyor with one article surface facing the conveyor and the other article surface facing away from the conveyor;

vacuum applicator means for substantially simultaneously applying a vacuum to each of the plurality of discrete articles on said conveyor at the article surface thereof facing the conveyor;

detector means for detecting the flow of a gaseous fluid through said plurality of discrete articles on said conveyor during application of vacuum thereto; and article removal means responsive to the detecting of the flow of gaseous fluid through at least one of said plurality of discrete articles on said conveyor by said detector means to remove said plurality of discrete articles from said conveyor said conveyor comprising a conveyor belt having an outer conveyor belt surface and a plurality of grommets attached to said conveyor belt on said outer conveyor belt surface, each said grommet for supporting a discrete article of said plurality of articles, and said grommets and said conveyor belt having openings therein providing a plurality of gaseous fluid flow paths leading from the plurality of discrete articles positioned on said grommets to said detector means.

2. The apparatus according to claim 1 wherein said conveyor belt is a fiberglass conveyor belt and wherein said grommets are formed of leak-proof, resilient material and form air-tight seals between said fiberglass conveyor belt and plurality of discrete articles positioned on the grommets when vacuum is applied to the plurality of discrete articles.

3. The apparatus according to claim 1 additionally comprising pressurized gas applicator means for applying a pressurized gas to said plurality of discrete articles on said conveyor while said vacuum applicator means applies a vacuum to said plurality of discrete articles, said pressurized gas engaging the surfaces of said plurality of discrete articles facing away from the conveyor whereby said pressurized gas and said vacuum are applied at the same time to opposed surfaces of said plurality of discrete articles.

4. The apparatus according to claim 3 wherein said pressurized gas applicator means includes helium source means, said pressurized gas at least partially comprising helium.

5. The apparatus according to claim 4 wherein said pressurized gas applicator means includes a plurality of pressure heads defining head interiors for accommodating pressurized gas, each of said pressure heads for selective engagement with a single discrete article of said plurality of discrete articles and means for moving said pressure heads into engagement with said plurality of discrete articles.

6. The apparatus according to claim 5 wherein said pressure heads include head seal means for forming air-tight seals with said plurality of discrete articles about said head interiors.

7. The apparatus according to claim 3 wherein said vacuum applicator means initially applies a vacuum to said plurality of discrete articles prior to initial application of pressurized gas thereto by said pressurized gas applicator means, said apparatus additionally comprising separator means cooperable with said detector means and said article removal means to separate discrete articles having a gaseous flow therethrough detected by said detector means solely in response to the application of vacuum thereto by said vacuum applicator means from discrete articles having a gaseous flow therethrough detected by said detector means in response to both the application of vacuum thereto by said vacuum applicator means and by the application of pressurized gas thereto by said pressurized gas applicator means.

8. The apparatus according to claim 1 wherein said means for positioning discrete articles includes alignment guide members engageable by discrete articles on said conveyor during movement of said conveyor to align said discrete articles on said conveyor.

9. The apparatus according to claim 1 wherein said conveyor belt has an inner conveyor belt surface and wherein said vacuum applicator means includes a vacuum table having a gaseous fluid inlet, said vacuum table for engagement with the inner conveyor belt surface with said gaseous fluid inlet being in communication with the openings of said conveyor belt and said grommets.

10. The apparatus according to claim 9 including means for effecting relative movement between said conveyor belt and said vacuum table to selectively move said conveyor belt and said vacuum table either toward or away from each other.

11. The apparatus according to claim 2 wherein said grommets are molded from rubber and adhesively secured to said fiberglass conveyor belt.

12. The apparatus according to claim 1 including sensor means for sensing the absence of a discrete article on a grommet and cooperable with said moveable conveyor to terminate movement of said conveyor belt when absence of a discrete article on a grommet is sensed.

13. The apparatus according to claim 1 including sensor means for sensing the presence of more than one discrete article on a grommet and cooperable with said moveable conveyor to terminate movement of said conveyor belt when more than one discrete article on a grommet is sensed.

14. The apparatus according to claim 5 wherein said pressure heads are disposed above said moveable conveyor and in alignment in the direction of movement of said moveable conveyor, said means for moving said pressure heads into engagement with said plurality of discrete articles including a plurality of fluid pressurized cylinders, each of said fluid pressurized cylinders being operatively associated with a single pressure head.

15. The apparatus according to claim 1 additionally comprising grommet cleaner means for cleaning said grommets after removal of discrete articles therefrom by said article removal means.

16. Conveyor apparatus for use when testing can lids or other discrete articles having opposed surfaces for leaks, said conveyor apparatus comprising, in combination:

a fiberglass conveyor belt having an inner conveyor surface and an outer conveyor surface and defining a plurality of spaced conveyor belt openings; and a plurality of grommets located at said conveyor belt openings and having grommet openings defining a gaseous fluid flow path leading between said outer conveyor surface and said inner conveyor surface, said grommets being formed of resilient material and affixed to said fiberglass conveyor belt.

17. The conveyor apparatus according to claim 16 wherein said resilient material is molded rubber material.

18. The conveyor apparatus according to claim 16 wherein said resilient material is fluoraelastomer.

* * * * *